United States Patent [19]

Notagashira et al.

[11] Patent Number: 4,660,933
[45] Date of Patent: Apr. 28, 1987

[54] LENS DRIVING DEVICE

[75] Inventors: Hidefumi Notagashira; Akiyasu Sumi; Hiroyoshi Inaba; Makoto Katsuma, all of Kanagawa; Hiroyasu Murakami, Tokyo; Akira Hiramatsu, Kanagawa, all of Japan

[73] Assignee: Canon Kabushiki Kaisha, Tokyo, Japan

[21] Appl. No.: 857,143

[22] Filed: Apr. 29, 1986

Related U.S. Application Data

[63] Continuation of Ser. No. 561,550, Dec. 14, 1983, abandoned.

[30] Foreign Application Priority Data

Dec. 17, 1982 [JP] Japan .................. 57-222755

[51] Int. Cl.⁴ ............................................ G02B 7/04
[52] U.S. Cl. .................................................. 350/255
[58] Field of Search .................. 350/255; 354/400; 310/323, 328; 369/44–45

[56] References Cited

U.S. PATENT DOCUMENTS

| | | | |
|---|---|---|---|
| 4,019,073 | 4/1977 | Vishnevsky | 310/322 |
| 4,231,646 | 11/1980 | Iida | 354/400 |
| 4,423,941 | 1/1984 | Iwata et al. | 350/255 |
| 4,456,356 | 6/1984 | Okabe | 350/255 |
| 4,484,099 | 11/1984 | Kawai et al. | 310/323 |
| 4,495,432 | 1/1985 | Katsuma et al. | 310/328 |

FOREIGN PATENT DOCUMENTS

| | | | |
|---|---|---|---|
| 595813 | 3/1978 | U.S.S.R. | 310/328 |
| 620003 | 8/1978 | U.S.S.R. | 310/328 |
| 641549 | 1/1979 | U.S.S.R. | 310/328 |

Primary Examiner—William H. Punter
Attorney, Agent, or Firm—Toren, McGeady and Goldberg

[57] ABSTRACT

Travelling oscillation waves are generated in a lens assembly at an oscillation element by impressing a voltage to an electro-restriction element or elements, whereupon a lens driving operation is performed by frictionally driving a moving element which is pressed in contact with the oscillation element. In the case of manual operation, an oscillation ring operating as the oscillation element is separated from a rotation ring which constitutes the moving element by a clutch device and then the rotation ring is manually rotated for effecting the lens driving operation.

11 Claims, 7 Drawing Figures

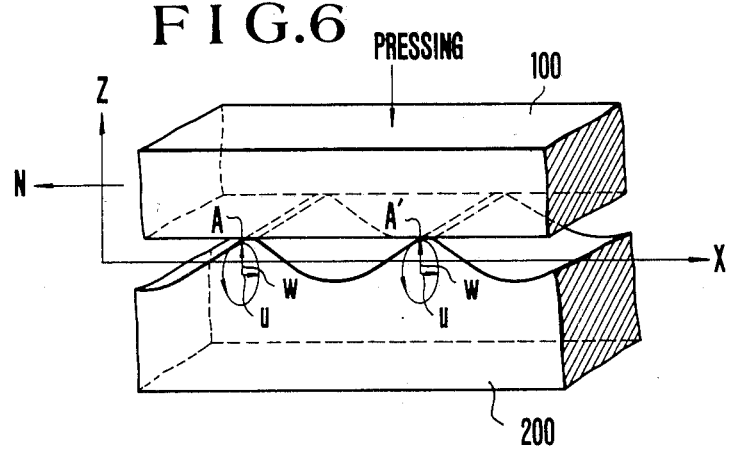
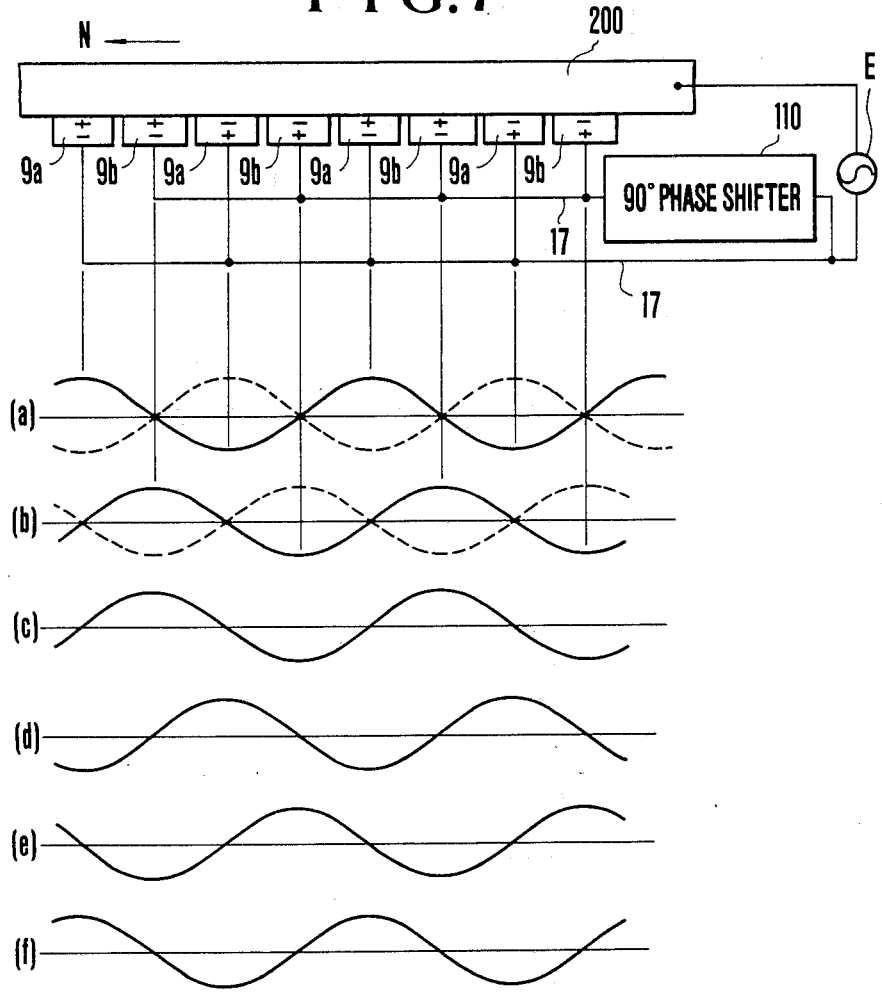

LENS DRIVING DEVICE

This is a continuation of application Ser. No. 561,550, filed Dec. 14, 1983, now abandoned.

BACKGROUND OF THE INVENTION

1. Field of the Invention

The present invention relates to a lens driving device using an oscillation wave motor.

2. Description of the Prior Art

When an oscillation wave motor with electrorestriction elements is used for a lens driving, the device can be simplified and made compact, but certain problems will arise. That is, since the oscillation wave motor has an oscillator and a moving element pressed against each other and uses the frictional force generated therefrom as a driving transmission source as will be described below, a great amount of force overcoming said frictional force will be needed in order to move a rotation ring for a rotor which is a moving element at the time of a manual (driving) operation. Thus, a torque greater than a frictional torque will be needed at the time of a manual operation for lens driving, and it has been necessary to reduce the torque for securing better operating characteristics. Also, while there is known a method which operates to place the oscillation of an oscillation ring for a stator as an oscillator in a stationary wave state for reducing the contacting area between the oscillation ring for the stator and a rotation ring for the rotor, thus reducing the friction torque, it will be necessary in such a method to supply power to the electrorestriction elements even at the time of a manual operation. This results in a problem increasing the power consumption which requires a power source with a greater capacity. Further, there could be utilized a method which operates to provide a clutch mechanism to secure pressure contact and separation of the oscillation ring for a stator and the rotation ring for a rotor, but when merely a clutch mechanism alone is provided, when the coupling is released by the clutch the rotation ring for the rotor which operates as a moving element will have too small a rotation load, and, therefore, a problem will arise causing difficulty in retaining the rotation of the same at a desired position.

SUMMARY OF THE INVENTION

An object of the present invention is to provide a lens driving device which separates the frictional surface of an oscillation ring for a stator and of a rotation ring for a rotor by a simple clutch mechanism at a time of a manual driving operation for reducing the driving torque, in order to eliminate the above-mentioned problems, and at the same time to give an appropriate amount of load to the rotation ring for the rotor for enhancing the lens driving characteristic at the time of a manual operation.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there is illustrated and described preferred embodiments of the invention.

BRIEF DESCRIPTION OF THE DRAWINGS

FIG. 6 is a schematic diagram depicting the principle of an oscillation wave motor.

FIG. 7 is a schematic diagram depicting driving of an oscillation wave motor.

DESCRIPTION OF THE PREFERRED EMBODIMENTS

Figure 1:
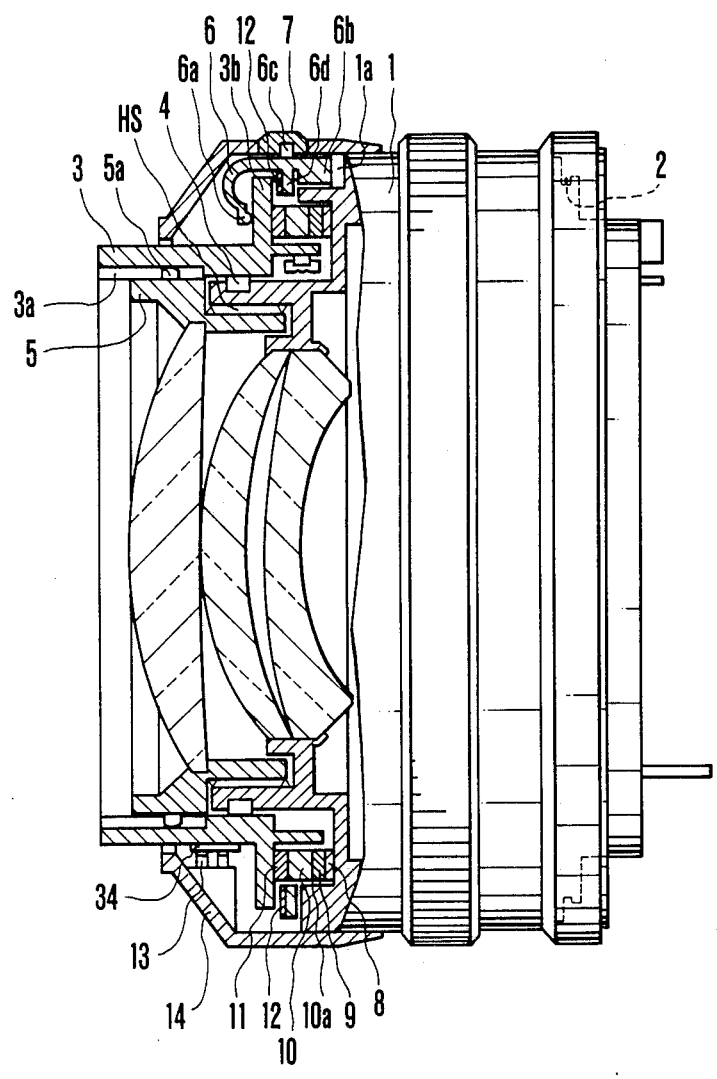
FIG. 1 is a vertical cross-sectional view of a lens driving device according to the present invention.
Figure 2:
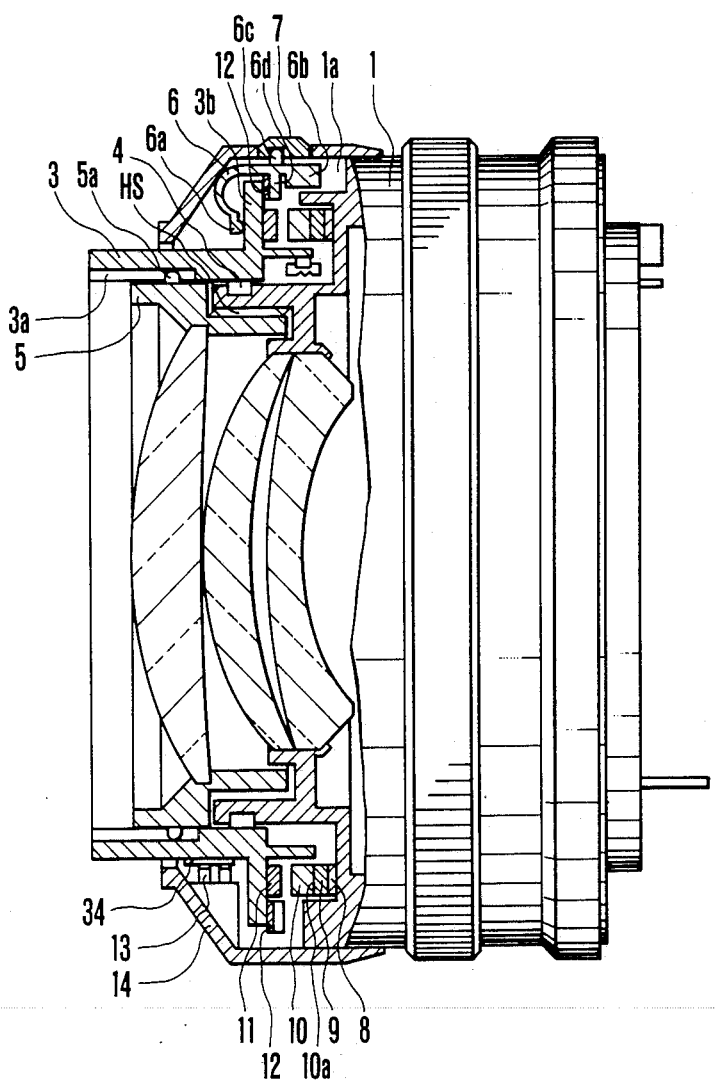
FIG. 2 is a vertical cross-sectional view when the device shown in FIG. 1 is changed over to a manual mode.

An embodiment of the present invention shall be described referring to the drawings wherein there is shown FIG. 1 and FIG. 2, a lens assembly comprising a fixed barrel 1 and a mounting device 2 such as a bayonet or a screw mount, etc. provided at a rear part of the fixed barrel 1 for mounting the lens assembly on a camera (not shown). A rotation or distance ring 3 comprises a rotor and is supported by rollers 4 between the ring 3 and the fixed barrel 1 so that the ring can rotate around the optical axis. Straight forward grooves 3a are provided at a front part of the rotation ring 3, and pins 5a provided at portions of a lens holding frame 5 are inserted thereinto. The fixed barrel 1 and the lens holding frame 5 are coupled by helicoidal screws HS. A clutch ring 6 is provided at outer peripheries of the fixed barrel 1 and the rotation ring 3 and has a straight moving key 6b inserted into a straight forward groove 1a formed at a part of the fixed barrel 1. A pressure contacting arm 6a having a springy characteristics operates to bias the rotation ring 3 toward the fixed barrel 1, and a ring 6d having bonded thereto a sliding torque adjusting member 12 sandwiches a disk 3b provided on the periphery of the rotation ring 3 between itself and the pressure contacting arm 6a having a manual driving operation. A pin 6c is inserted into a switch operation member 7, etc. An oscillation ring 10 comprises a stator and an electrostriction on element 9 is bonded onto one surface thereof through an insulating layer 10a. Further, the ring 10 is supported on the fixed barrel 1 with a felt member 8 for absorbing vibrations sandwiched therebetween. A rigid rubber ring 11 is bonded to the disk part 3b of the rotation ring 3 in a manner facing the oscillation ring for facilitating frictional driving by travelling oscillation waves generated at the oscillation ring 10.

A comb tooth circuit board 34 is attached to the outer periphery of the rotation ring 3 and has comb tooth electrodes, having a structure such that sliding pieces 13 attached to an inner wall surface of an outer cover 14 slide over the comb tooth electrodes for generating pulses corresponding to the amount of rotation of the rotation ring 3.

Figure 3:
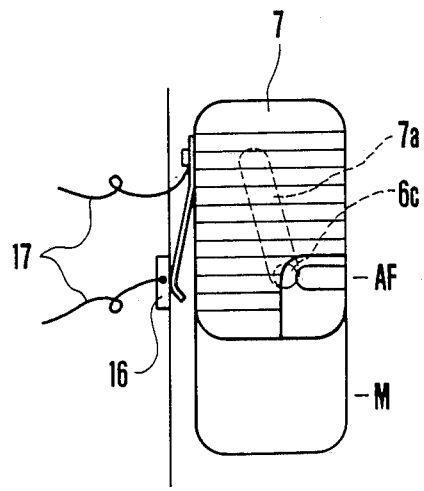
FIG. 3 is an enlarged plan of a switch operation member of FIG. 1.
Figure 4:
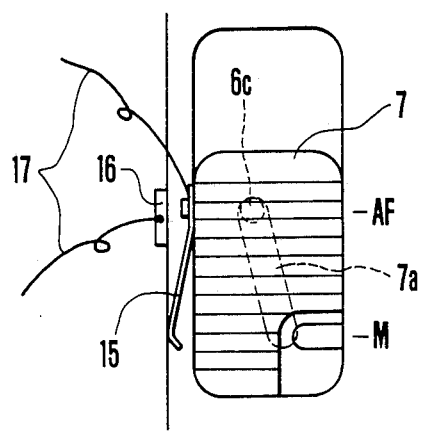
FIG. 4 is an enlarged plan of a switch operation member of FIG. 2.

FIG. 3 and FIG. 4 show details of the switch operating member 7 shown in FIG. 1 and FIG. 2, respectively. As shown in FIG. 3, when the switch operating member 7 is moved to an AF driving position, the clutch ring 6 moves to the fixed barrel 1 side through the pin 6c inserted into a cam 7a and biases the rotation ring 3 toward the fixed barrel 1 side through the pressure contacting arm 6a, so that the rigid rubber ring 11 is made to pressure contact with the oscillation ring 10. At this time, a sliding piece 15 provided on the switch member 7 contacts with an electric contact plate 16 thereby placing an AF driving switch on the ON state. Lead wires 17 connect the sliding piece 15 and the electric contact plate 16 with a power source (not shown).

When the switch operating member 7 is moved to a manual driving position as shown in FIG. 4, the clutch ring 6 moves to a direction separating from the fixed barrel 1 through the pin 6c inserted into the cam 7a for separating the rigid rubber ring 11 attached to the disk 3b of the rotation ring 3 and the oscillation ring 10 from each other, and at the same time, the disk 3b will be sandwiched between the ring 6d having the sliding torque adjusting member 12 bonded thereon and the pressure contacting arm 6a, so that an appropriate weaker load torque is imparted thereto. At this time, the sliding piece 15 and the electric contact plate 16 separate from each other placing the AF driving switch in the OFF state.

Figure 5:
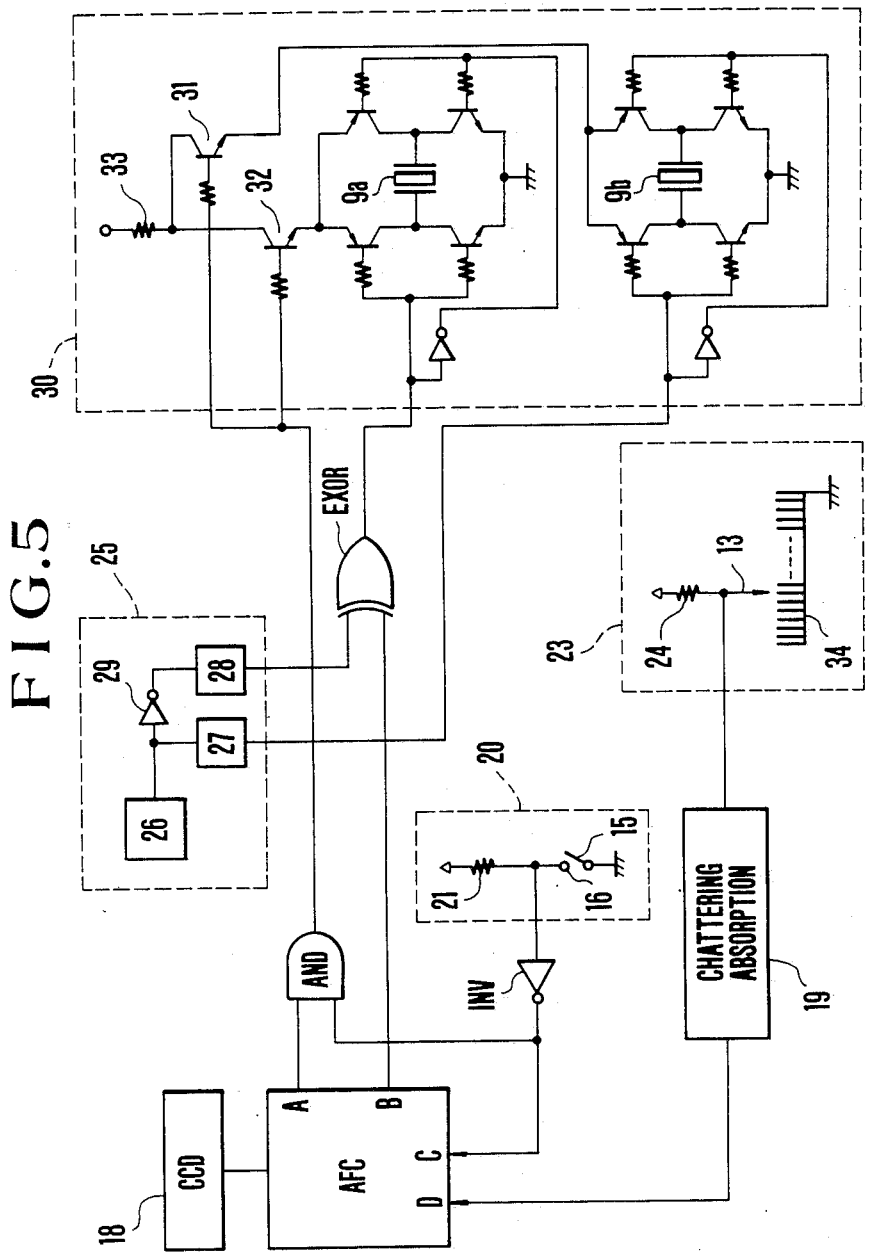
FIG. 5 is a control circuit diagram of a lens driving device of FIG. 1.

FIG. 5 shows a control circuit connection diagram to control the lens barrel of the above-mentioned example. In FIG. 5, there is shown a sensor 18 for AF which comprises a CCD (charge coupled device) sensor. The AFC is a circuit for operational processing and for producing control signals for AF to be connected to the sensor 18, and has output terminals A, B and input terminals C, D. The output terminal A is an oscillation output terminal for driving an oscillation wave motor, producing a driving signal which is an "H" signal and a stopping signal which is an "L" signal. The output terminal B is for producing a directional signal on a driving of the oscillation motor, producing, for example, a close-up side driving "H" signal and an infinite side driving "L" signal. The input terminal C is for the manual electric operation change over signal for lens driving, for effecting a change in the range of AF focusing as an example. The input terminal D is to receive pulses corresponding to the amount of driving of the lens from a pulse generation circuit 23 to be described below.

The examples shows a focusing system wherein light beams divided into three by an AF beam splitter prism (not shown) are received by the CCD for obtaining signals for a front focusing operation, an in-focus, and a rear focusing, respectively, that is a contrast detection system. Since an AF operation is well known in the art, explanations of details are omitted here. As a matter of course other types of focusing systems, for example, a deviation detection system and an oscillation wave detection system, etc. can also have the present invention applied thereto.

The pulse generation circuit 23, which consists of the sliding pieces 13 moving on the comb tooth electrodes 34 and a resistance 24 having one end thereof connected to the sliding pieces 13 and the other end connected to a constant voltage source (not shown), generates pulses every time the sliding pieces 13 contact with the comb tooth electrode 34 by a rotation of the rotation ring. A chattering absorption circuit absorbs chattering elements out of signals from the electrodes 34 connected to a power source through the resistance 24. A manual electric change over circuit for a lens driving consists of the sliding piece 15 and the contact plate 16 shown in FIG. 3 and FIG. 4, wherein one end of the sliding piece 15 is grounded while the contact plate 16 is connected to a power source (not shown) through a resistance 21, also connected to the input terminal C of the circuit AFC as well as to an AND circuit AND through an inverter INV. A pulse generation circuit 25 produces pulses having a phase difference of 90° from each other, and consists of an oscillator 26, a frequency divider 27 having outputs of the oscillator directly introduced thereinto, and a frequency divider 28 having the same output introduced thereinto through an inverter 29. A driver circuit 30 drives electrostriction elements 9a, 9b, and constitutes a push-pull circuit with a plurality of transistors, resistances, inverters, etc. Switching transistors 31, 32 place a power source applying a voltage onto the electrostriction elements 9a, 9b through the push-pull circuit in ON-OFF states, and are connected to a power source (not shown) through a resistor 33. The power source is connected to a lens driving power source switch (not shown). EXOR is an exclusively OR circuit to effect a phase change over of +90°, −90° for the driving signals of the electrostriction element 9a against the driving signals of the electrostriction element 9b by the terminal output B of the AFC circuit.

In the operation of the device described above, by closing a lens driving power source switch (not shown), power source voltage is supplied to the pulse generation circuit 25, the driver circuit 30, the manual electric change over circuit 20, and the pulse generation circuit 23, and other circuits, AND, INV, EXOR are also placed in an operative state.

First, an AF driving operation shall be explained. When the switch operating member 7 is changed over to AF, a state shown in FIG. 3 is secured, and the rigid rubber ring 11 bonded to the rotation ring 3 and the oscillation ring 10 are pressure contacted with each other by the pressure contacting arm 6a as shown in FIG. 1, then the electrostriction elements 9 (9a, 9b) oscillate to produce travelling oscillation waves at the oscillation ring 10. Therefore, the rotation ring 3 will be driven to rotate around the optical axis by the travelling oscillation waves. Also, as the contact plate 16 is grounded the manual electric change over circuit 20 shown in FIG. 5 produces "L" signal, but as the signals go through the inverter INV, "H" signals will be introduced into the circuit AFC, and thus an electric lens driving is detected and an AF driving will be effected.

When a first step of the stroke of a release button having two steps is pressed for a photo-taking operation of a camera, a light-sensing circuit (not shown) is activated and at the same time, the circuit AFC and the AF circuit in the chattering absorbing circuit 19 will also be activated. A state of focusing will be operated in accordance with known art based on information on an object entering into the CCD 18, and an amount of driving as well as a direction of driving for the lens will be computed. The amount of lens driving is preset at a counter of the circuit AFC and the direction is also produced out of the output terminal B. If an object is located at the close-up side as an example, the output terminal B produces an "H" signal. Also after the operations by the circuit AFC, the lens driving instruction, "H" signal, will be produced at the output terminal A. Therefore, the AND circuit produces an "H" signal to place both of the transistors 31 and 32 in a closed state, and thus the power source voltage is supplied to the electrostriction elements 9a, 9b. The pulse generation circuit 25 is an oscillation state, and the frequency divider 28 produces pulses having phases advanced 90° over that of the frequency divider 27 and the pulses are introduced into the EXOR circuit. At this time, since the other input terminal has an "H" signal, the EXOR circuit produces pulses having the state of input pulses just as they are. Then, pulse signals having phases differing by 90° respectively oscillate the electrostriction elements 9a, 9b through respective push-pull circuits, and travelling oscillation waves are generated at the oscillation ring 10 to rotate the rotation ring 3 to a prescribed direction. The lens holding frame 5 is then shifted by said such rotation to the optical axis direction through the helicoidal screws HS, so that the lens is driven to bring it in focus at the close up side. By the rotation of the rotation ring 3 the sliding piece 13 repeats ON-OFF operation with the comb teeth of the electrode 34 and introduces pulses with numbers corresponding to a rotation angle of the rotation ring 3, such pulses corresponding to an amount of shifting of the lens into the circuit AFC through the chattering absorbing circuit 19, and then down-counting will be effected in turn with the counter. When the counter indicates "0", both output terminals A, B will have an "L" signal, outputs of both AND, EXOR circuits will have an "L" signal, and then the transistors 31, 32 are placed in an open state whereby power will not be supplied to the electrostriction elements 9a, 9b, and the driving of the rotation ring 3 will be stopped. Then, again a range finding is made by the AF range finding system (the sensor CCD, the circuit AFC), and in case of an in-focus state the output terminal A will make an in-focus action with the "L" signal as it is, and in case of an out of focus state a lens driving will be made in the same manner as mentioned above. Since the output terminal B will have the "L" signal when an object is at an infinite side, an output inverting the output of the frequency divider 28, that is, pulses having phases being 90° delayed from that of the pulses of the frequency divider 27 will be produced from the EXOR circuit and will be introduced into the push-pull circuit to drive the rotation ring 3 by travelling oscillation waves for securing an in-focus state at the infinite side.

Since the rotation ring 3 rotates the lens holding frame 5 at the same time, the frame 5 rotates through the helicoidal screws HS and moves to the front and to the rear in the optical axis direction and thus a lens driving for AF will be made.

In the operation of the device for manual driving, the switch member 7 is changed over to manual (M), the disk 3b is pushed with the ring 6d of the clutch ring 6 for pushing the rotation ring 3, and therefore a state shown in FIG. 4 is secured, and the rigid rubber ring 11 bonded to the rotation ring 3 and the oscillation ring 10 are separated through the ring 6d having the sliding torque adjusting member 12 bonded thereon, as shown in FIG. 2, and at the same time, the disk 3b is sandwiched between the sliding torque adjusting member 12 and the pressure contacting arm 6a to provide an appropriate load torque. Under such conditions, the rotation ring 3 protruding out of an inside of a fore end of the outer cover 14 is rotated manually for driving the lens to an intended position. At this time, since the contact plate 16 in FIG. 5 is not grounded, the manual electric change over circuit 20 produces the "H" signal, but as the "L" signal is introduced into the AND circuit AND through the inverter INV, the output of the AND circuit AND will have an "L" signal. Therefore, the transistors 31, 32 are placed in an open state, and power is not supplied to the electrostriction elements 9a, 9b. Thus the oscillation ring 10 will not produce travelling oscillation waves, so that a manual operation can be easily accomplished as mentioned above. Although, a focusing driving for a lens is effected in the example shown in the drawings, even when the oscillation wave driving device is used as a zoom lens driving source that is a driving source for power zoom driving, the arrangement explained above can be used for a change over between a manual mode and an automatic mode.

As has been explained above, a simple clutch mechanism is provided between an oscillation ring and a rotation ring in an oscillation wave driving device, and an appropriate amount of load is given to the rotation ring when the oscillation ring and the rotation ring are separated by the clutch means. Therefore, it is not necessary to supply power to reduce frictional resistance at a time of manual driving, so that power consumption at the time of manual driving can be eliminated. Also, since an appropriate amount of rotation load is given to the rotation ring, an effect can be obtained such that a manual lens driving can be achieved with good maneuverability.

There now will be explained the rotation principle of the rotation ring 3 with travelling oscillation waves generated at the oscillation ring 10 using the electrostriction elements 9a, 9b mentioned above. In FIG. 6, a moving element (rotation ring) is represented by 100 and an oscillator (oscillation ring) is represented by 200, while the axis x is to represent a direction on a surface of the oscillator 200, and the axis z is a direction of the normal line thereof. When an oscillation is imparted by the electrostriction elements to the oscillator 200, oscillation waves are generated and travel on the surface of the oscillator. The oscillation waves are surface waves having longitudinal waves and transverse waves, and the material point A thereof makes oscillations to trace an elliptical locus. When attention is paid to the material point A, an elliptical movement is made with a longitudinal amplitude u, and a transverse amplitude w, and when a travelling direction of the surface wave is represented as $+x$ direction, the elliptical movement is to rotate in the counterclockwise direction. The surface wave will have apexes A, A' ... for every wave length, and an apex speed V has only x element, and a relation, $V=2\pi fu$ (wherein f represents frequency), is secured. When the surface of the moving element 100 is contacted with the surface of the oscillation element 200 by pressure means (not shown), the surface of the moving element contacts with only apexes A, A' ..., therefore, the moving element 100 will be driven to the direction of an arrow N by frictional force with the oscillation element 200.

A speed of the moving element 100 in the direction N shown by the arrow will be proportionate to the frequency f. Also, since a frictional driving with pressure contact is made, the driving depends not only on the longitudinal amplitude u but also on the transverse amplitude w. That is, the speed of the moving element 100 is in proportion to size of the elliptical movement, and the greater the elliptical movement, the faster the speed will be. Therefore, a speed of the moving element will be in proportion to the voltage applied to the electrostriction elements.

FIG. 7 shows the oscillator 200 and an arrangement of electrostriction elements 9a, 9b bonded onto the oscillator with adhesive or the like for oscillating the oscillator, with the state shown being for the generation of stationary waves and travelling oscillation waves.

The electrostriction elements 9a, 9b are arranged such that during driving in said arrangement, the oscillator will achieve resonance, that is, stationary waves are present, and the stationary wave length generated by the electrostriction element 9a is equal to the stationary wave length generated by the element 9b and they are so arranged that their stationary waves have phases which differ by 90° from each other, that is, the physical positioning thereof is λ(wavelength/4).

The electrostriction elements 9a, 9b are arranged such that the elements, having different characteristics have opposite directions of strain when the same voltage is applied thereto, and the elements 9a and 9b are placed alternatively.

A driving power source E operates as the voltage impressing means for the electrostriction elements and supplies alternating voltages with $V = V_0 \sin \omega t$ characteristic. At the time of driving operation a voltage with $V = V_0 \sin \omega t$ characteristic will be impressed on the electrostriction element 9a through lead wires 17, and a voltage with $V = V_0 \sin(\omega t \pm \pi/2)$ characteristic will be impressed on the electrostriction element 9b through the lead wires 17 by a 90° phase shifter 110. The ± mark represents the directions of strain of the electrostriction elements 9a, 9b, wherein "+" indicates an elongation direction of the elements and "−" indicates a shrinking direction of the same, and the "±" is changed over by the direction to which the moving element is moved. That is, the direction of the travelling oscillation waves generated at the oscillation element 200 will be inverted depending on whther the phase is deviated by the 90° phase shifter 110 by +90° and whether the same is deviated by −90°, whereby the direction to which the moving element moves will be changed. The solid line in the graph (a) of FIG. 7 shows oscillation states by the stationary waves produced at the oscillation element 200 in a case where the alternating voltage of $V = V_0 \sin \omega t$ is impressed only to the electrostriction element 9a and the graph (b) shows the same in a case where the alternating voltage of $V = V_0 \sin(\omega t - \pi/2)$ is impressed only to the electrostriction element 9b, respectively. Broken lines in the graphs (a), (b) show oscillation states by stationary waves generated when a voltage with opposite polarity is impressed.

The graphs (c), (d), (e) and (f) show oscillation states (states of generation of travelling oscillation waves) of the oscillator 200 when the above-mentioned voltages, $V_0 \sin \omega t$ and $V_0 \sin(\omega t - \pi/2)$ are simultaneously impressed to the elements 9a, 9b, respectively, wherein (c) shows the case, $t = 2n\pi/\omega$, and (d) shows the case of $t = \pi/2\omega + 2n\pi/w$, while (e) shows the case of $t = \pi/\omega + 2n\pi/\omega$, and (f) shows the case of $t = 3\pi/2\omega + 2n\pi/\omega$. While the travelling oscillation waves travel to the right direction any material point A (FIG. 6) on a driving surface of the oscillator 200 makes elliptical movement in the counterclockwise direction. Therefore, the moving element 100 in pressure contact with the driving surface of the oscillator moves to the left as shown by the arrow N.

Under the condition represented by the stationary waves of the graphs (a), (b), in material points other than the node on the friction driving transmission surface of the oscillator 200, only transverse waves will operate, that is, only up and down movements will be made in FIG. 6. Since the condition of frictional surface contact between the oscillator 200 and the moving element 100 which is in pressure contact therewith is not a stationary frictional state but is in a dynamic frictional state, the contacting surface is reduced. Therefore, when the moving element 100 is moved to the moving direction by external force, the movement can be made with smaller force, as the stationary waves are generated, than in a case when the stationary waves are not generated.

The rotation ring 3 representing the rotor in the example of FIG. 1 and FIG. 2 corresponds to the moving element 100 in FIG. 6 and FIG. 7, while the oscillation ring 10 representing the stator corresponds to the fixed member 200. Therefore, the rotation ring 3 in the example shown will be driven to the normal and reverse directions based on the principle explained above, and the lens holding frame 5 moves front and rear in the optical axis direction in association therewith, thus effecting an AF driving operation.

In FIG. 7, each group of the electrostriction elements 9a, 9b does not have to have a plurality of elements respectively arranged, and instead a single element may be partially polarized for forming one group equivalent thereto.

While specific embodiments of the invention have been shown and described in detail to illustrate the application of the inventive principles, it will be understood that the invention may be embodied otherwise without departing from such principles.

What we claim:

1. A lens driving device, comprising:
   an oscillation ring operating as a stator having electrostriction elements attached thereto;
   a rotation ring operating as a rotor which is pressure contacted with said oscillation ring operating as the stator and receives oscillations of the oscillation ring, thus rotating around an optical axis;
   a lens holding frame moving parallel to the optical axis following the rotation of said rotating ring; and
   clutch means for effecting pressure contact and separation between said oscillation ring and said rotation ring, said clutch means applying a load to said rotation ring during separation of said oscillation ring and said rotation ring which is independent of the load applied during pressure contact, said independent load applied during separation being weaker than the load applied on said rotation ring during pressure contact between the rings effected by said clutch means.

2. A lens driving device according to claim 1, further comprising operating means for effecting said pressure contact and separation of said clutch means, with said operating means being manually operated.

3. A lens driving device according to claim 2, further comprising:
   switch means which is changed from a first state to a second state in operative association with the pressure contact of said clutch means, said switch means supplying said electrostriction element with electric power in the second state.

4. A lens driving device according to claim 2, wherein said operating means includes a switch and effects power supply control by opening and closing of said switch.

5. A lens apparatus comprising
   (a) an oscillation member having an electromechanical energy conversion element;
   (b) a moving member movable by the oscillation of the oscillation member when said member makes pressure contact with the oscillation member;

(c) a lens holding frame movable in parallel to an optical axis by the movement of the moving member; and (d) a load changeover member for changing over between a first state wherein said pressure contact is effected between said oscillation member and the moving member and a second state wherein a load weaker than that imparted to the moving member by said pressure contact is imparted to the moving member.

6. A lens apparatus comprising:

(a) an oscillation ring having an electromechanical energy conversion element;

(b) a lens holding frame moving parallel to an optical axis;

(c) a distance ring for rotating around the optical axis;

(d) a mechanism for converting the rotation of said distance ring into parallel movement of said lens holding frame; and (e) a clutch means for press contacting said oscillation ring with said distance ring, said clutch means imparting a load smaller than that produced by said press contact to said distance ring when said oscillation ring is not brought into press contact with said distance ring.

7. A lens apparatus according to claim 6, wherein said clutch means includes:

(a) an elastic member for press contacting said oscillation ring with said distance ring;

(b) an operating member for separating said oscillation ring from said distance ring against the strength of said elastic member in accordance with manual operation; and (c) means for imparting a load smaller than that produced by said press contact to said distance ring when said distance ring is not brought into contact with said oscillation ring.

8. A lens apparatus according to claim 7, wherein said operating member is provided at a position other than on said distance ring.

9. An apparatus according to claim 8, further comprising:

switch means which is changed out of a first state into a second state in operative association with the press contact of said clutch means, said means supplying said electromechanical energy conversion element with electric power in the second state.

10. A lens driving device, comprising:

(a) an oscillation member having an electromechanical energy conversion element;

(b) a mechanism for changing the position of the lens, said mechanism having a moving member which is brought into pressure contact with said oscillation member and is movable by the oscillation of said oscillation member to change the position of the lens in the direction of the optical axis by the oscillation of said oscillation member, and said mechanism being manually operative to change the position of the lens independently from the oscillation of said oscillation member; and (c) load changeover means for rendering the load on said lens position change mechanism during manual operation weaker than the load on the lens position change mechanism given thereto during drive of said lens position change means by the oscillation of said oscillation member.

11. A lens drive device according to claim 10, wherein said lens position change mechanism has a manual operation portion and said changeover means changes the load on said manual operation portion.

* * * * *